United States Patent Office 3,513,980
Patented May 26, 1970

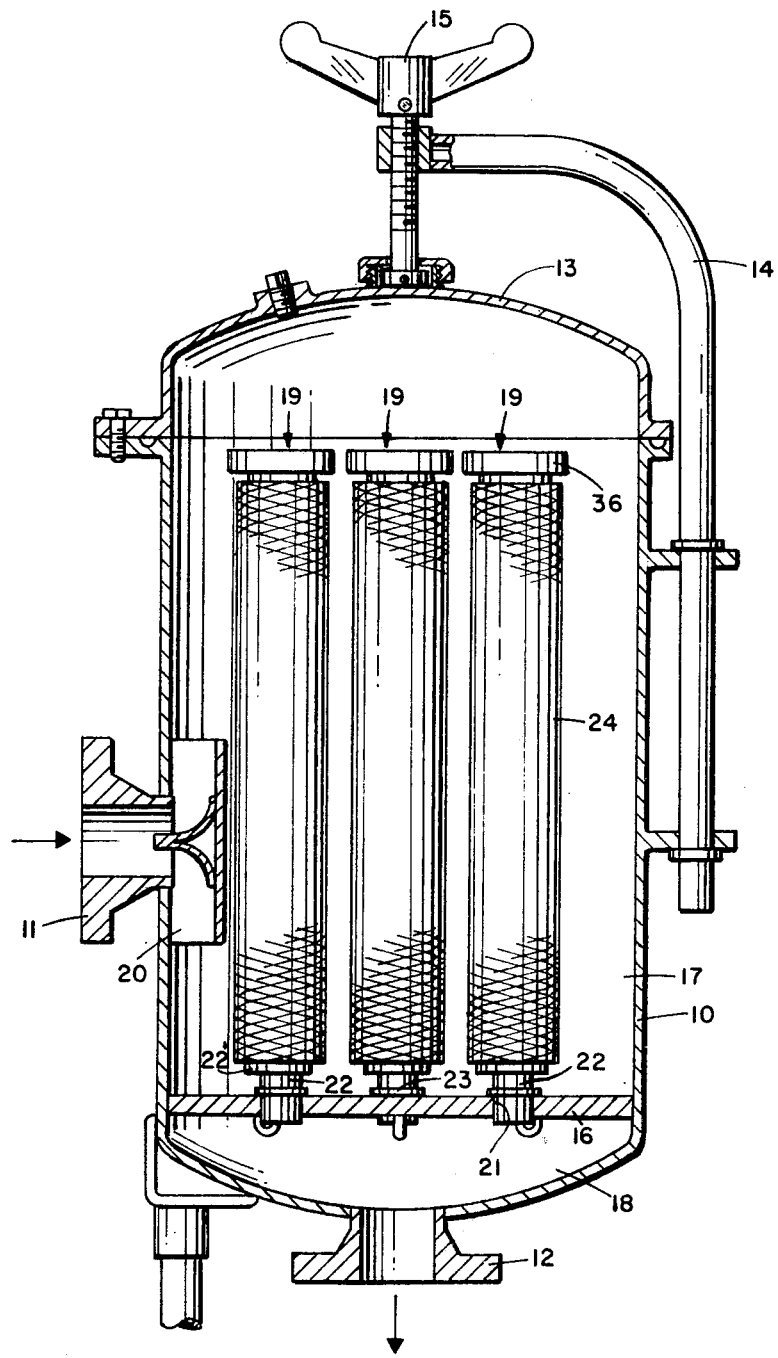
FIG. I

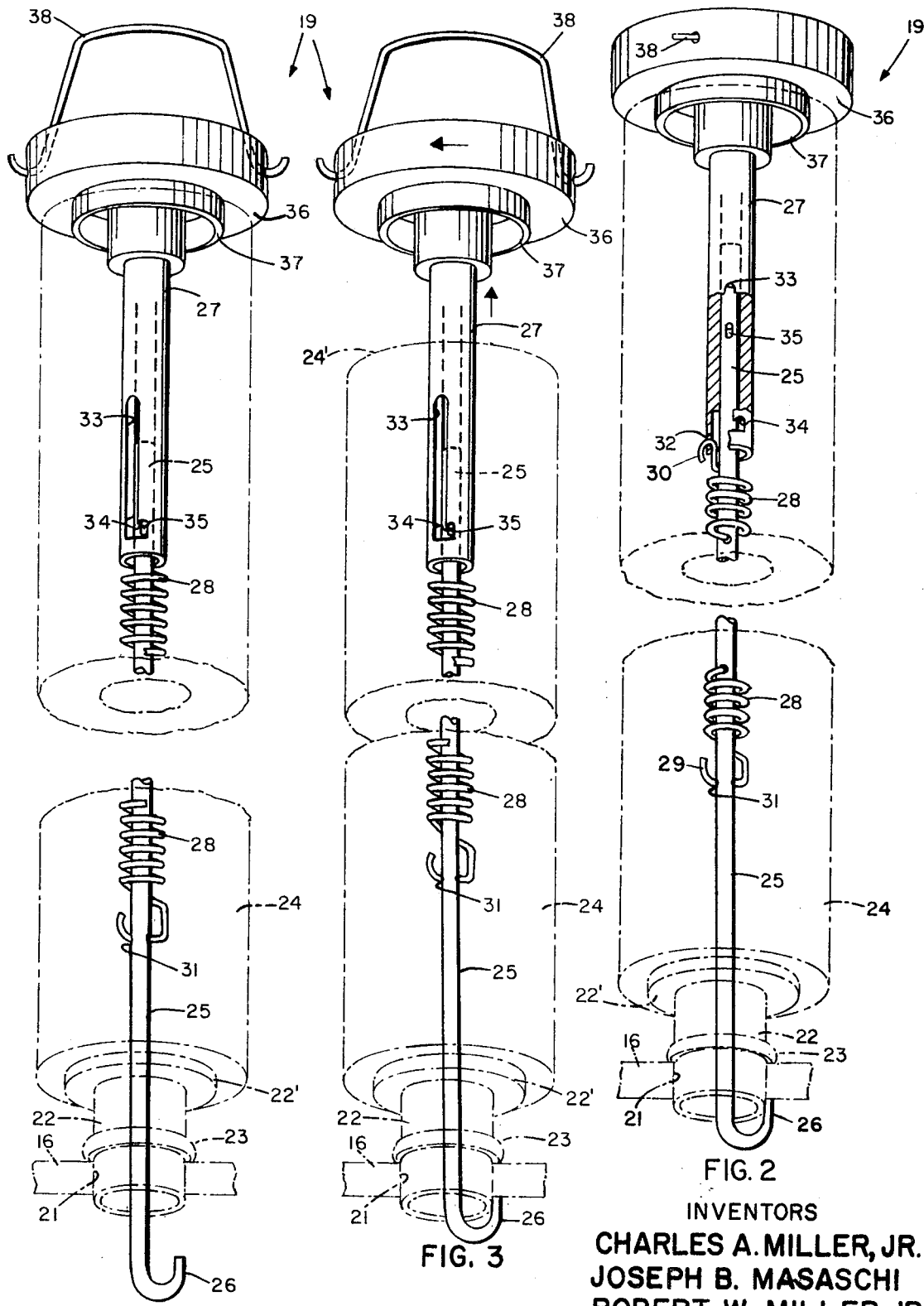

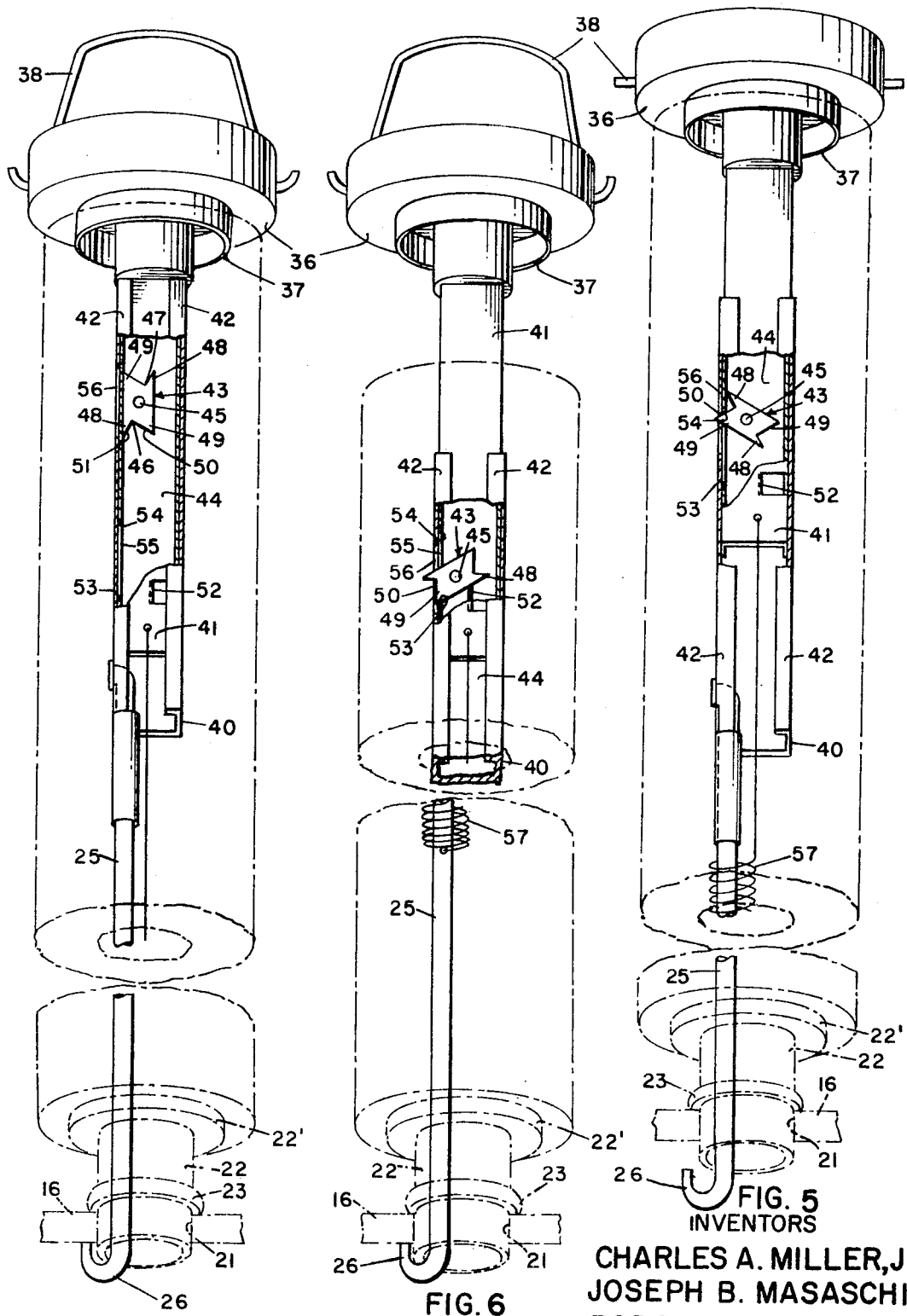

3,513,980
FILTER TUBE SECURING MEANS
Joseph B. Masaschi, Charles A. Miller, Jr., and Robert W. Miller, Jr., Baltimore County, Md., assignors to Filterite Corporation, Timonium, Md., a corporation of Maryland
Filed Dec. 8, 1967, Ser. No. 689,156
Int. Cl. B01d 27/08
U.S. Cl. 210—238                    9 Claims

ABSTRACT OF THE DISCLOSURE

A filter having one or more elongated tubular filtering units within a casing through which the fluid to be filtered flows, each unit being held within the casing by a resiliently contractible fastening means having one end attached to a partition wall within the casing, the contractible means extending through the unit and operable from the end thereof remote from the end attached to the header, the fastening member being contractible to resiliently urge the filter unit into sealing engagement with the header and hold it in place and being provided with means to hold the same in extended position for ready attachment and detachment from the partition wall.

---

This invention relates to tubular fluid filters of the type in which one or more tubular filter units are positioned within a casing and are sealingly attached to a partition, or header wall dividing the casing into two compartments with an intake pipe in the casing on one side of the header wall and outlet pipe from the casing on the other side of the header wall and passage of fluid from intake side to outlet side of the casing taking place through the filter units.

More particularly this invention relates to a filter of the general tubular type described in which the tubular filter units have a central opening and are readily attachable and detachable from the header wall and therefore the invention is particularly concerned with the fastening means for sealingly attaching the filter units to the header wall.

It is one object of this invention therefore to provide a filter with filter units which may be quickly attached to or detached from the header wall without the aid of special tools.

A further object of the invention is to provide a fixed seal between the holding means and the sealing means at the end of the filter unit opposite the header, and to provide means in which attaching or detaching a unit may be effected from the end thereof remote from the end which is attached to the header.

It is still another object to provide a filter unit which, in effect, is self sealing, that is, requires no separate gaskets or other sealing means at either end.

The above and other objects and advantages will become more apparent as this description proceeds and reference is had to the accompanying drawing forming a part of this specification.

In said drawing:

FIG. 1 is a sectional view of a filtering device in which the present invention is incorporated;

FIG. 2 is a perspective view of one filter unit with the filter element shown in phantom to more clearly illustrate the fastening means for the unit, the latter being shown in filter tube holding position;

FIG. 3 is a view similar to FIG. 2 with the fastening means in release position;

FIG. 4 is a view similar to FIG. 3 with the fastening means disengaged from the header ferrule and the unit ready for removal;

FIG. 5 is a view of a modified form of filter tube securing means in position for attaching or detaching the filter tube;

FIG. 6 is a similar view of the modified form in an intermediate stage in the operation of attaching a filter tube in place; and FIG. 7 is a view of the modified form with the securing means in filter tube holding position.

Referring to the drawing in more detail, and particularly to FIG. 1 thereof, 10 represents a casing, which may be of any cross-sectional shape, provided with an inlet pipe 11 and an outlet pipe 12. The casing is provided with a removable closure 13 at one end which is held in place by a conventional clamping means 14 and 15.

A partition or header wall 16 divides the casing into two compartments or chambers 17 and 18, the chamber 17 being the larger and containing one or more filter units generally designated 19 which will be hereinafter described in more detail.

The intake pipe 11 communicates with the filter chamber 17 containing the filter units and is provided with a baffle or diversion member 20 within the casing to more evenly distribute the fluid to be filtered throughout the chamber 17 and around the filter units.

The partition or header plate is provided with a number of openings 21 corresponding to the number of filter units to be accommodated within the casing and each opening is fitted with a ferrule 22 sealingly fixed in the header opening and extending on both sides of the header or partition plate and forming, in effect, a flange around each opening on each side of the plate.

To effect the sealing engagement of each ferrule 22 in the header plate opening, the ferrule may conveniently be press fitted into the openings, although any other means of fixing the same may be employed. For convenience, to insure uniformity of fitting each ferrule in its opening, the ferrule may be provided with a bead or flange 23 which forms a stop for abutment against the header plate as the ferrule is inserted.

The ferrule 22 is further provided with an enlarged portion having a cylindrical flange 22' concentric with the ferrule proper but of larger diameter to engage the end of a filter unit and form a seal therewith.

Referring now more particularly to FIGS. 2, 3 and 4 of the drawings, it may be seen that each filter unit 19 is in the form of a hollow tube 24 of filtering material. Various filtering materials which may be employed are well known, such as spirally wound yarn, so called filter papers, fabrics, etc. but the specific materials employed are not important to this invention, as it is more concerned with the means of sealingly attaching the tubular filter unit to the header plate.

One form of attaching or holding means comprises a rod 25 having a hook 26 at one end thereof and a tubular element 27 telescoped over the rod at its end remote from the hook 26.

A spring 28 under tension is telescoped over the rod 25 and has its hooked ends 29 and 30 attached to the rod through an opening 31 in the rod and through an opening 32 in the tubular element respectively and normally holds the rod telescoped well within the tubular element.

The tubular element is provided with a longitudinal slot 33 with a lateral branch 34 in its side wall, somewhat of the nature of a bayonet slot, while the rod 25 is provided with a pin 35 slidable in the slot 33 and branch 34.

The free end of the tubular element 27 is equipped with an enlarged head sealing member 36 having a flange 37 concentric with and spaced outwardly from the tubular element to sealingly engage the opposite end 24' of the filter unit to seal the opening therethrough.

The rod element 25 and the tubular telescoping element 27 are adapted to extend through the opening within a filter tube for holding the sealing member 36 and the flange 37 in contact with the end of the filter tube opposite the header. The sealing member 36 and the flange portion 37 constitute a single unitary sealing unit. This sealing unit is fixedly sealed axially to the end of the holding element opposite the header in any convenient manner such as welding, brazing, soldering, etc. This construction eliminates the necessity of packing, gaskets, washers, etc. being used to seal this outer sealing member about the holding means which is necessary in the present type tube holding means, wherein the sealing means positioned over the end of the filter tube opposite the header is slidable along the supporting element. The means for extending the holding means 25 and 27 for removing the filter etc. will be referred to move fully hereinafter.

A handle, or bail 38 may be attached to the head member 36 to assist in manipulating the fastening means when attaching the filter unit in place as hereinafter described.

To attach a filter unit to the header plate or wall the rod 25 is pulled outwardly of the tubular element 27 until the pin 35 is opposite the lateral branch 34 of the slot 33 thus holding the spring stretched and the rod 25 and tubular element 27 in extended relationship to each other. The rod 25, tubular element 27 are then passed through the filter element and the latter positioned against the ferrule flange 22' with the hook 26 extended through and beyond the ferrule as shown in FIG. 4. The hook is then manipulated to engage over the edge of the ferrule as shown in FIG. 3 whereupon a slight pull on the bail handle 38 and a turn to the left will allow the pin 35 to enter the longitudinal slot 33 permitting the spring 28 to pull the rod 25 into the tubular element 27 thereby causing the flanges 22' and 37 to forcibly engage the opposite ends of the filter unit and hold the same in place on the ferrule 22.

The forcible engagement of the flanges 22' and 37 with the ends of the filter unit will be sufficient to form a seal between the flanges and the unit and no additional seals such as separate gaskets are necessary.

To detach a filter unit the above outlined steps are reversed.

It should be noted that the steps required for attaching and detaching a filter unit may be accomplished entirely from the end remote from the header, an important feature, especially in filters with many closely spaced units as it is evident that any attaching means which would require handling or manipulation close to the header plate would present difficulties in such a congested space.

Referring now to the modified form of attaching means for a filter unit as shown in FIGS. 5, 6 and 7, there is provided an outer channel member 40 and an inner channel member 41 slidably telescoping with the outer channel member. The outer channel member has side flanges 42 to retain the inner channel within the outer and allow for sliding movement of the two channel members with respect to each other.

A rotary pawl member 43 is mounted on the web portion 44 of the outer channel member by means of a rivet or other equivalent fastening means 45 which permits free rotary movement of the pawl.

The pawl 43 is of generally rectangular form with the opposite ends thereof notched at 46 and 47 to provide V-shaped teeth 48 and 49 on each side of the longitudinal central axis of the pawl. These teeth, as can be seen, are not symmetrical as tooth 49 has a longer side surface 50 than the side surface 51 of tooth 48. The surfaces 50 and 51 of the V-shaped teeth are adapted to have engagement with abutment means provided therefor on the inner channel member 41.

One such abutment on the inner channel member may be formed by a struck up tongue or lug 52 located on the web portion of the channel while other abutments are formed by the end edges 53 and 54 of an opening 55 through one of the flanges on the inner channel member.

The outer channel member is also provided with an opening 56 but its purpose is merely to allow clearance for rotation of the pawl in the different positions it must assume in its function.

The inner channel member 41 is rigidly attached to the head member 36 with its flange 37 and handle 38 exactly duplicating corresponding parts in the first form above described, while the outer channel member 40 is attached to a rod 25 with hook 26, these parts duplicating corresponding parts in the first modification.

A tension spring 57 is stretched between the inner channel member 41 and the rod 25 and normally urges the two channel members to fully telescoped position.

The operation of the device shown in FIGS. 5, 6 and 7 is as follows.

Starting, for convenience, from the position shown in FIG. 7, in which the telescoping channels are in fully retracted position and holding a filter tube in position against the ferrule flange 22', an upward pull on the handle 38 will cause the inner channel member to move upwardly within the outer channel member until lug 52 engages surface 50 of prong 49 of the pawl, at which point opening 55 on the inner channel will be opposite the pawl and opening 56 of the outer channel member. The cam action of lug 52 against the inclined surface 50 will cause the pawl to rotate until side surface 51 of prong 48 contacts the side of lug 52. At this position of rotation of the pawl the opposite prong 49 will project through openings 55 and 56 in the side flanges of both channels. If the pull on the handle 38 is then released the prong 49 projecting through the openings in side flanges of the inner and outer channel members will engage the end surface 54 of the opening in the inner channel while the adjacent prong 48 will engage the inner surface of the side flange of the inner channel adjacent the opening therein as shown in FIG. 5 and the two telescoping channels will be held in extended position. The hook 26 may then be released and the filter unit removed. By again pulling upwardly on the handle 38, with the hook 26 engaged with the ferrule 22, the lug 52 will engage the side surface of the pawl as shown in FIG. 6 and rotate the same to a position where release of the pull on handle 38 will allow the end surface 54 to contact the side surface of the pawl and allow the members to return to the initial position shown in FIG. 7. Thus it may be seen that successive pulls and releases on handle 38 are all that is required to operate the fastening means and change from filter locking to filter releasing position.

It will be noted in this construction that there is no need for a slip packing joint between the outer sealing member and the holding means through which unclean fluid circulating through the filter may seep by the packing joint into the side of the filter carrying the clean filter fluid.

While specific structures have been shown for the sealing and attaching means, it is not intended that the invention be limited to these particular means.

What is claimed is:
1. In a fluid filter having a casing through which the fluid flows, a partition wall within said casing and a filter unit mounted on said partition wall, the improvement which comprises,
 (a) said partition wall having at least one opening therethrough;
 (b) a tubular filter unit of greater diameter than the opening in said partition wall, an end surface adapted to be positioned over said opening on one side of the partition wall to form a sealed relationship with said partition wall;
 (c) a resiliently contractible fastening means extending through the tubular filter unit having means at one end to releasably rigidly fix the said end thereof to the partition wall;

(d) said fastening means having means at its opposite end engaging the opposite end of the tubular filter unit and means for resiliently urging the unit toward the partition wall about the opening at one side of the said wall;
(e) means for releasably holding the resiliently contractible fastening means in rigid extended position, said resiliently contractible fastening means comprising a rigid rod-like element having a hook at one end thereof and at least a partially tubular portion in cross section at the opposite end thereof, a telescoping element slidably telescoping said tubular portion, and a spring having one end attached to the rod-like element and the other end attached to the telescoping element to normally urge the rod-like element toward the telescoping element.

2. In a fluid filter having a casing through which the fluid flows, a partition wall within said casing and a filter unit mounted on said partition wall, the improvement which comprises,
(a) said partition wall having at least one opening therethrough;
(b) a tubular filter unit of greater diameter than the opening in said partition wall, an end surface adapted to be positioned over said opening on one side of the partition wall to form a sealed relationship with said partition wall;
(c) a resiliently contractible fastening means extending through the tubular filter unit having means at one end to releasably rigidly fix the said end thereof to the partition wall;
(d) said fastening means having means at its opposite end engaging the opposite end of the tubular filter unit and means for resiliently urging the unit toward the partition wall about the opening at one side of the said wall;
(e) means for releasably holding the resiliently contractible fastening means in rigid extended position, said means at the opposite end of the fastening means engaging the opposite end of the tubular filter unit comprising, a sealing head including a flange fixedly sealed to the fastening means, said flange engaging the end surface of the filter unit in sealing engagement therewith.

3. In a fluid filter having a casing through which the fluid flows, a partition wall within said casing and a filter unit mounted on said partition wall, the improvement which comprises,
(a) said partition wall having at least one opening therethrough;
(b) a tubular filter unit of greater diameter than the opening in said partition wall, an end surface adapted to be positioned over said opening on one side of the partition wall to form a sealed relationship with said partition wall;
(c) a resiliently contractible fastening means extending through the tubular filter unit having means at one end to releasably rigidly fix the said end thereof to the partition wall;
(d) said fastening means having means at its opposite and engaging the opposite end of the tubular filter unit and means for resiliently urging the unit toward the partition wall about the opening at one side of the said wall;
(e) means for releasably holding the resiliently contractible fastening means in rigid extended position, said resiliently contractible fastening means comprising two telescoping members, means mounted on the members operable upon outward extension of the members and subsequent contraction thereof to hold the members in either rigid extended position or in released resilient filter unit holding position.

4. In a fluid filter having a casing through which the fluid flows, a partition wall within said casing and a filter unit mounted on said partition wall, the improvement which comprises.
(a) said partition wall having at least one opening therethrough;
(b) a tubular filter unit of greater diameter than the opening in said partition wall, and end surface adapted to be positioned over said opening on one side of the partition wall to form a sealed relationship with said partition wall;
(c) a resiliently contractible fastening means extending through the tubular filter unit having means at one end to releasably rigidly fix the said end thereof to the partition wall;
(d) said fastening means having means at its opposite end engaging the opposite end of the tubular filter unit and means for resiliently urging the unit toward the partition wall about the opening at one side of the said wall;
(e) means for releasably holding the resiliently contractible fastening means in rigid extended position, said resiliently contractible fastening means comprising two telescoping members, a rotary pawl on one of the members, first abutment means on the other member positioned to contact the pawl upon outward extension of the members to rotate the pawl to a position wherein the said pawl will engage a second abutment on the other member and hold the members in extended position, and wherein said first abutment will again engage the pawl and rotate the same to a release position upon a subsequent outward extension of the members to permit the members to telescope to contracted position.

5. In a fluid filter having a casing including a fluid inlet and a fluid outlet associated therewith through which the fluid flows, a tubular filter unit mounted in said casing having one end in sealed relationship with an opening in said casing and an outer end member adapted to sealingly engage the opposite end of the tubular filter unit, the improvement which comprises:
(a) a fastening means for said tubular filter unit adapted to extend through the tubular filter unit having one end extending through the opening and engaging a holding means positioned beyond the opening in the casing and its opposite end provided with means sealingly engaging the outer end member;
(b) a resiliently contractable means associated with the fastening means for contracting the same;
(c) means for releasably holding the fastening means and the means for sealingly engaging the opposite end of the filter tube in rigid extended position against the urging of the resilient means for releasing said fastening means from the filter.

6. In a fluid filter having a casing for receiving a tubular filter unit to be mounted in sealed engagement within said casing and in communication with an opening in said casing whereby all fluid passing through said opening passes through said filter unit, the improvement comprising:
(a) fastening means extending through the tubular filter unit from a first end thereof and toward the opposite end thereof, and adjustable between a contracted position for mounting the tubular filter unit in sealed engagement within said casing and an extended position for insertion and removal of said fastening means and said tubular filter element from said casing;
(b) said fastening means including first engaging means for sealingly engaging said first end of said tubular filter unit and second engaging means for engaging said casing adjacent the opening therein;
(c) resilient means normally urging said fastening means to said contracted position for rigidly positioning said filter unit within said casing with said one end of said filter unit in sealed engagement with said first engaging means of said fastening means and with the opposite end thereof in sealed engagement with said casing and in communication with said opening, and
(d) means for releasably holding said fastening means in extended position against the urging of said resilient means for release of said fastening means from said casing.

7. In a fluid filter system having a casing through which the fluid flows from a fluid intake to a fluid outlet, said casing having an opening therein and a tubular filter unit mounted in said casing surrounding said opening, comprising:
(a) said tubular filter unit being of greater diameter than the opening in said casing having an end surface adapted to be positioned over said opening and at one side thereof to form a sealed relationship with said casing;
(b) means to sealingly engage the opposite end of said tubular filter unit;
(c) a resiliently contractable fastening means extending through the tubular filter unit having means at one end to releasably fix the said end thereof in the system beyond the opening in the casing;
(d) said fastening means having its opposite end fixedly sealed to the opposite tubular filter unit means for sealingly engaging the opposite end of the filter unit for resiliently urging one end of the tubular filter unit about the side of the casing opening and for resiliently urging the opposite means for sealingly engaging the opposite end of the filter unit in sealed relationship therewith; and
(e) means for releasably holding at least a part of the resiliently contractable fastening means and the means for sealingly engaging the opposite end of the filter unit in rigid extended position against the urging of the resilient means for releasing of said fastening means and filter unit from the casing.

8. A structure as defined in claim 7 wherein the opening in the casing is provided with a ferrule against which one end of the tubular filter unit is urged by said fastening means.

9. In a fluid filter having a casing for receiving a tubular filter unit to be mounted in sealed engagement within said casing and in communication with an opening in said casing whereby all fluids passing through said opening pass through the said filter unit, the improvement comprising;
(a) means for sealingly engaging the outer end of the tubular filter unit;
(b) a releasable fastening means for mounting said tubular filter unit within said casing; said fastening means extending through the tubular filter unit from the end adjacent the casing to the opposite end thereof and being adjustable between a contracted position and an extended position for mounting the tubular filter unit in sealed engagement with said casing;
(c) the opposite end of the fastening means extending through the tubular unit being provided with at least a rigid portion adjacent its end and being fixedly sealed to the means sealingly engaging the outer end surface of the tubular filter unit;
(d) resilient means normally urging said fastening means to said contracted position for rigidly positioning said filter unit within said casing with one end of the filter unit in sealed engagement with the casing and in communication with said opening and the opposite end in sealed engagement with the means sealingly engaging the opposite end of said tubular filter unit;
(e) means for releasably holding said fastening means in extended position against the urging of said resilient means for releasing the filter tube from the casing.

References Cited
UNITED STATES PATENTS

| | | | |
|---|---|---|---|
| 2,872,044 | 2/1959 | Kasten | 210—488 X |
| 3,279,608 | 10/1966 | Soriente et al. | 210—232 |
| 3,405,807 | 10/1968 | Burkhardt | 210—232 |

REUBEN FRIEDMAN, Primary Examiner

T. A. GRANGER, Assistant Examiner